US010369469B2

United States Patent
Sherr et al.

(10) Patent No.: US 10,369,469 B2
(45) Date of Patent: Aug. 6, 2019

(54) RUNTIME ANIMATION SUBSTITUTION (71) Applicant: ELECTRONIC ARTS INC., Redwood City, CA (US)

(72) Inventors: Simon Sherr, Casselberry, FL (US); Brett Peake, Alberta (CA)

(73) Assignee: Electronic Arts Inc., Redwood City, CA (US)

(*) Notice: Subject to any disclaimer, the term of this patent is extended or adjusted under 35 U.S.C. 154(b) by 90 days.

(21) Appl. No.: 15/347,636

(22) Filed: Nov. 9, 2016

(65) Prior Publication Data

US 2018/0126275 A1 May 10, 2018

(51) Int. Cl.
*G06T 13/00* (2011.01)
*A63F 13/525* (2014.01)
*A63F 13/35* (2014.01)
*G06T 13/40* (2011.01)

(52) U.S. Cl.
CPC ............ *A63F 13/525* (2014.09); *A63F 13/35* (2014.09); *G06T 13/40* (2013.01)

(58) Field of Classification Search
CPC ................................ A63F 13/35; A63F 13/525
See application file for complete search history.

(56) References Cited

U.S. PATENT DOCUMENTS

| 5,982,389 A * | 11/1999 | Guenter | G06T 13/40 345/474 |
| 5,990,908 A * | 11/1999 | Thingvold | G06T 13/40 345/474 |
| 7,636,093 B1 * | 12/2009 | Kuwamoto | G06T 13/80 345/474 |
| 9,358,456 B1 * | 6/2016 | Challinor | A63F 13/04 |
| 9,741,146 B1 * | 8/2017 | Nishimura | G06T 13/40 |
| 2005/0071306 A1 * | 3/2005 | Kruszewski | A63F 13/10 706/47 |
| 2008/0273037 A1 * | 11/2008 | Girard | G06T 13/40 345/473 |
| 2009/0179901 A1 * | 7/2009 | Girard | G06T 13/40 345/474 |
| 2010/0113153 A1 * | 5/2010 | Yen | A63F 13/06 463/37 |
| 2010/0238182 A1 * | 9/2010 | Geisner | G06T 13/00 345/474 |
| 2012/0143358 A1 * | 6/2012 | Adams | G06F 3/011 700/92 |
| 2015/0002517 A1 * | 1/2015 | Lee | G06T 17/10 345/474 |

* cited by examiner

*Primary Examiner* — James S McClellan
*Assistant Examiner* — Kevin M Carter
(74) *Attorney, Agent, or Firm* — Lowenstein Sandler LLP (57) ABSTRACT

A method of runtime animation substitution may include detecting, by a processing device of a video game console, an interaction scenario in an instance of an interactive video game, wherein the interaction scenario comprises a target animation associated with a game character. The method may further include identifying, by the processing device, a valid transitional animation. The method may further include causing, by the processing device, the valid transitional animation to be performed by the game character in the instance of the interactive video game.

20 Claims, 8 Drawing Sheets

RUNTIME ANIMATION SUBSTITUTION

TECHNICAL FIELD

The present disclosure is generally related to runtime animation substitution, and is more specifically related to detecting an interaction scenario in a game and replacing a portion of a target animation in the interaction scenario with a transitional animation.

BACKGROUND

An interaction scenario may be an animated scene in a video game, in which one or more game characters perform certain coordinated animations. In one embodiment, an amination may be a sequence of 3D skeleton animation frames, which when played back-to-back, create the illusion of movements of an interactive video game character. A transitional animation may allow a game character to blend (e.g., rotate, translate, change posture, etc.) from a current gameplay position into a new position determined by the interaction scenario.

BRIEF DESCRIPTION OF THE DRAWINGS

The present disclosure is illustrated by way of examples, and not by way of limitation, and may be more fully understood with references to the following detailed description when considered in connection with the figures, in which:

FIG. 7 is a block diagram illustrating runtime animation substitution scoring, according to an implementation.

DETAILED DESCRIPTION

Described herein are methods and systems for runtime animation substitution. Such methods and systems may allow select and trigger transitional animations in a course of an interactive video game.

Transitional animations may warp a current scene position (e.g., a position in a three-dimensional space of a scene) and/or a postural position (e.g., bodily position) of a game character from a current state into a different state at the beginning of a planned (target) animation. For example, when a basketball game character is in a dribbling position on the free-throw line, and is selected to enter a layup animation that begins 3 feet from the free-throw line, a transitional animation may warp the character's current scene position on the free-throw line into a scene position three feet from the free-throw line, from which he may begin the layup animation (target animation). This type of warping often looks unnatural to a game player when done using traditional methods.

For example, transitional animations may be created by using a physics engine. A physics engine may be a computer-implemented program (algorithm) that is designed to mimic the physical laws of real life. Physics engines may simulate animations based on physics movements. However, physics engines may not render as natural an animation as the type of motion-captured or hand-authored animation that pre-developed transitional animations are able to provide.

Another way in which a transitional animation may be created involves using a cinematic solution. In a cinematic solution, game characters may be "teleported" to desired locations where a cinematic set piece is played with the use of a camera cut to hide the teleport. Such a solution may not be desirable because the camera cut, or some other trick to hide the repositioning of the participants, may look unnatural.

Alternatively, game developers may hand-author transitional animations. This can be time consuming and resource intensive since different hand-authored transitional animations may be utilized to account for each starting scene position and each target animation (e.g., the animation into which the game character is to be blended). Such transitional animations may be stored in databases corresponding to specific positions and animations, and may not be able to be reused in a variety of contexts.

Thus, traditional solutions to the problem of warping a game player from a first position in a current state into a second position in an animation and location in 3D space to be performed are inefficient and often yield unnatural-looking results. Embodiments of the present disclosure address the above problems by allowing games to select and trigger transitional animations during gameplay. Furthermore, transitional animations are generally applicable and reusable, meaning separately defined transitional animations for each scene position and target animation are not utilized. Instead, a global database of available transitional animation blueprints is leveraged for each target animation during runtime.

Embodiments described herein describe operations that include detecting an interaction scenario including a target animation to be displayed and a target destination location in Cartesian space to play that specific animation, in an interactive video game and querying an animation database for a valid transitional animation corresponding to the target animation and desired location. In one embodiment, the query is sent to a database that is specific to the target animation, where the database contains only transitional animations that are valid for the particular target animation. In response to the query, valid transitional animations may be received from an animation database and one may be selected based on scoring criteria. The selected transitional animation may be caused to be displayed instead of the target animation for a certain time period or a number of frames. For example, a transitional animation may be played instead of a target animation for the first twenty frames of the target animation, so that more natural looking and self-motivated visual warp is achieved for the game character.

Embodiments described herein improve computer functioning by allowing content creators to save computing storage resources by leveraging a universal database of transitional animation blueprints to create smaller databases of transitional animations specific to target animations. Furthermore, the embodiments described herein improve computer functioning by enabling runtime operations to query smaller databases of transitional animations specific to target animations, thus utilizing less processing power and time than having to query a larger, universal database. Furthermore, embodiments described herein improve computer applications by providing more natural looking animations, by selecting a transitional animation during runtime according to defined scoring criteria.

It should be noted that while the embodiments described herein may refer to specific game characters and/or games, the operations described herein are applicable to any game character and any game on any system.

Figure 1:
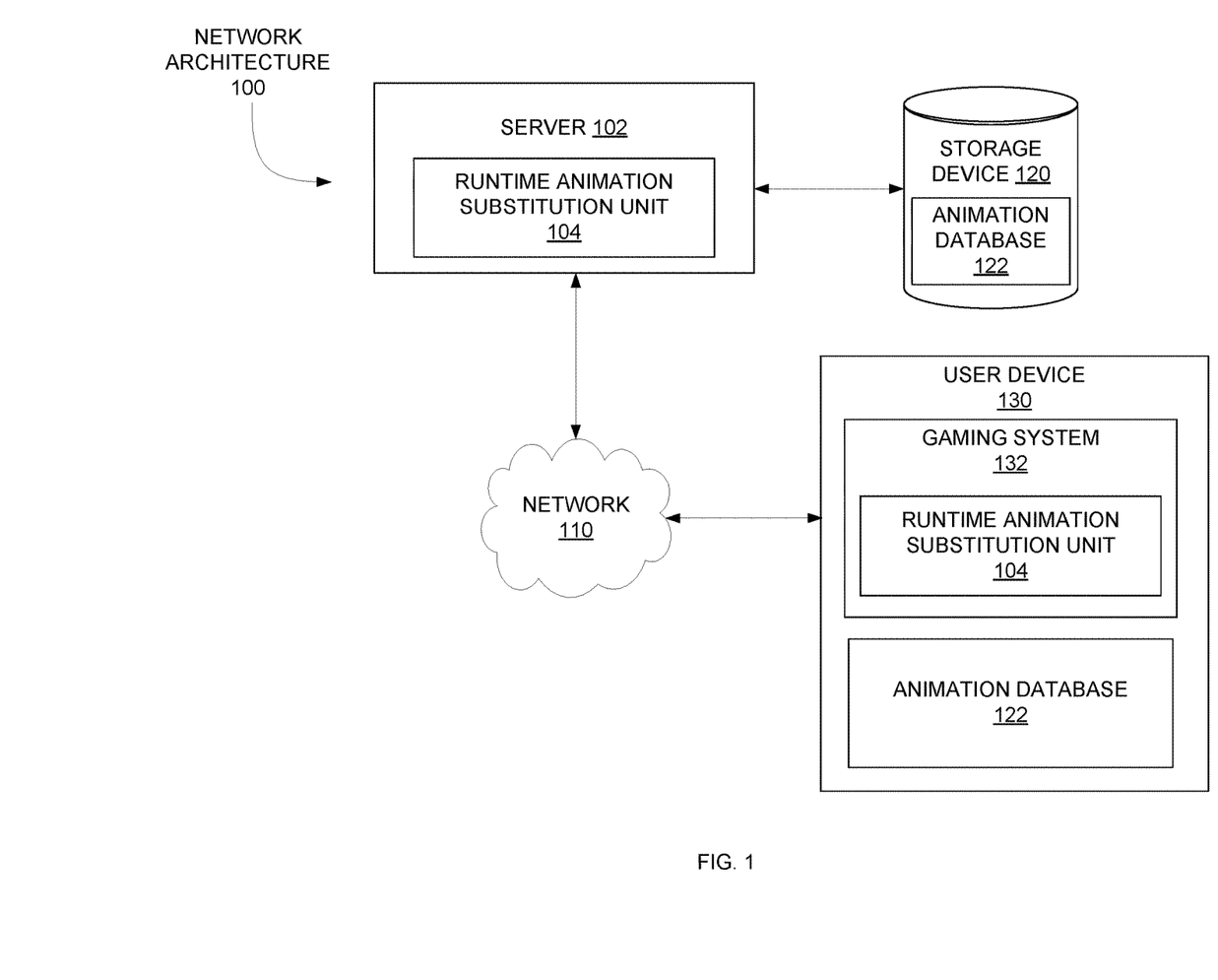
FIG. 1 is a block diagram illustrating an exemplary network architecture in which embodiments of the present disclosure may be implemented.

FIG. 1 is a block diagram illustrating an exemplary network architecture in which embodiments of the present disclosure may be implemented. The network architecture 100 may include one or more servers 102 communicating with one or more storage devices 120 and one or more user devices 130 over one or more networks 110, according to one embodiment. Network 110 can be a local area network (LAN), a wireless network, a telephone network, a mobile communications network, a wide area network (WAN), such as the Internet, or similar communication system.

Server 102 may include various data stores, and/or other data processing equipment. The server 102 may be implemented by a single machine or a cluster of machines. Server 102 may include, for example, computer system 700 of FIG. 7. In one embodiment, server 102 includes runtime animation substitution unit 104. In another embodiment, user device 130 of network architecture 100 may include gaming system 132. Gaming system 132 may be a computer program, gaming console program, or the like. Gaming system 132 may include runtime animation substitution unit 104. Animation substitution unit 104 may perform runtime animation substitution operations on data provided by storage device 120 and/or user devices 130 (e.g., from animation database 122).

Server 102 may be one server or it may represent multiple servers. In one embodiment, when a first user device connects to server 102 and a second user device connects to server 102, server 102 may be the same server that handles both devices' connections. In another embodiment, when a first user device connects to server 102 and a second user device connects to server 102, server 102 may represent different servers, so that each device connects to a different server.

In one embodiment, storage device 120 and/user device 130 includes animation database 122, which may include data provided by server 102 and/or user devices 130. In another embodiment, data provided by server 102 and/or user devices 130 are stored elsewhere, outside of animation database 122 or storage device 120. In one embodiment, animation database 122 is a global database associated with multiple interaction scenarios and/or animations. Animation database 122 may store untrimmed animations eligible to be included in interactions scenarios and animations. In one embodiment, untrimmed animations are animation blueprints that have not been edited to conform to a specific target interaction. Animation blueprints may be generic animations that are used to create other animations specific to a target animation. In this way, generic animations can be used repeatedly to create new blueprints for different target animations. Animation blueprints may be trimmed or otherwise edited to be utilized by specific target animations. Animation database 122 may include a subset of databases that are associated with particular interaction scenarios and/or target animations. In one embodiment, each database in the subset of databases is associated with only a single interaction scenario and/or target animation. For example, a database may have a one-to-one relationship with a target animation—each transitional animation in the database may be associated with a single target animation. This subset of databases may store trimmed animations (e.g., animations that have been cropped to suit a specific target animation) eligible to be included in a single interaction scenario and/or associated with a single target animation. In another embodiment, the subset of databases containing trimmed animations may be separate from animation database 122.

In one embodiment, server 102 may include runtime animation substitution unit 104 and storage device 120. In another embodiment, storage device 120 may be external to server 102 and may be connected to server 102 over a network or other connection. In other embodiments, server 102 may include different and/or additional components which are not shown here so as not to obscure the present disclosure. Storage device 120 may include one or more mass storage devices which can include, for example, flash memory, magnetic or optical disks, or tape drives, read-only memory (ROM); random-access memory (RAM); erasable programmable memory (e.g., EPROM and EEPROM); flash memory; or any other type of storage medium.

Figure 8:
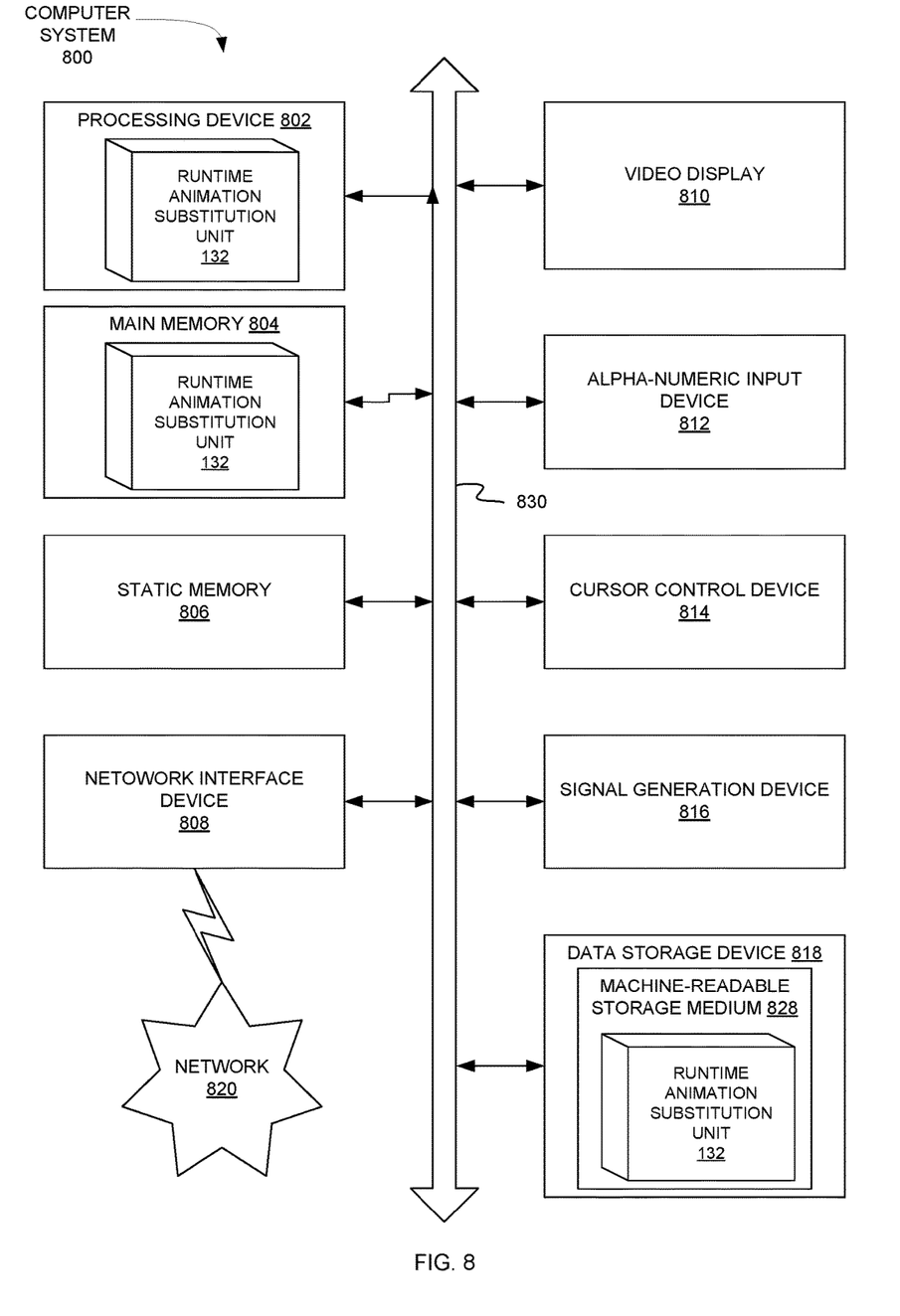
FIG. 8 is a block diagram of an example computer system that may perform one or more of the operations described herein.

In one embodiment, user device 130 may be any computing device (e.g., personal computer, server, mobile device, tablet, game system, etc.). User device 130 may include, for example, computer system 800 of FIG. 8 (Alternatively, computer system 800 of FIG. 8 represents server 102 of FIG. 1). User devices 130 may include gaming system 132, which may be provided, e.g., by one or more software modules and/or one or more hardware modules. In one embodiment, gaming system 132 provides access to a video game including runtime animation substitutions, as described herein. Gaming system 132 may include runtime animation substitution unit 104. In this embodiment, system 100 may not include server 102 and/or runtime animation substitution unit 104 of server 102. User device 130 may be connected via network 110 to other user devices and components not included in FIG. 1.

Figure 2:
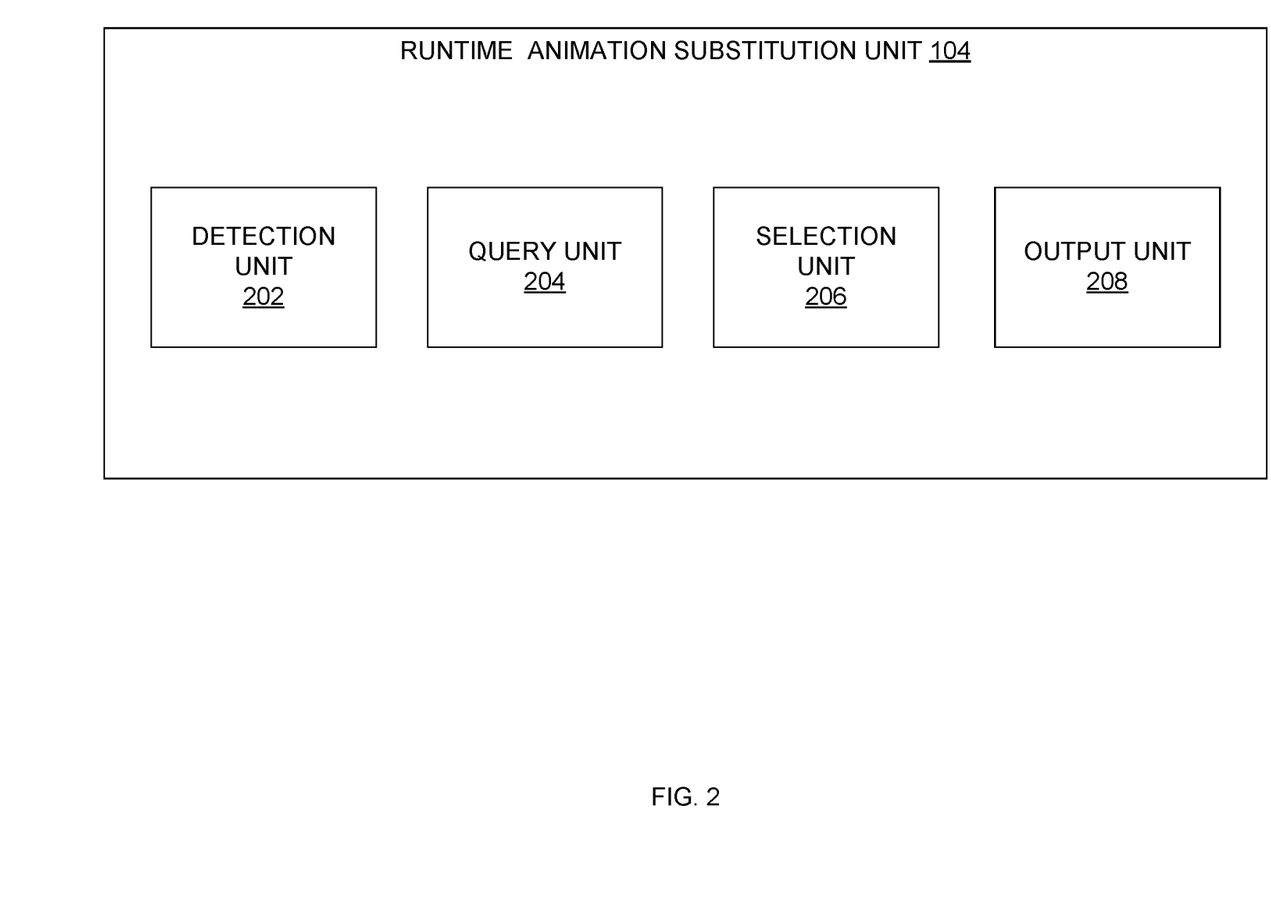
FIG. 2 is a block diagram illustrating a runtime animation substitution unit, according to an implementation.

FIG. 2 is a block diagram illustrating a runtime animation substitution unit 104, according to an implementation. In one embodiment, runtime animation substitution unit 104 may be implemented by hardware, software, or a combination of both hardware and software. In one embodiment, runtime animation substitution unit 104 is included in user device 130 and/or server 102 of FIG. 1. animation substitution unit 104 may include a detection unit 202, query unit 204, selection unit 206, and output unit 208. This arrangement of units may be a logical separation, and in other embodiments, these units or other components can be combined together or separated in further components, according to a particular embodiment.

Detection unit 202 may be responsible for detecting that an interaction scenario is currently playing or will be played in a game. An interaction scenario may include animations for any number of game characters. In one embodiment, if detection unit 202 detects that an interaction scenario is currently playing or about to be played, detection unit 202 may notify query unit 204 of the detection. In one embodiment, to detect that an interaction scenario is currently playing or will be played, detection unit 202 may receive an indication from a runtime process that the interaction scenario is currently playing or about to be played. In another embodiment, detection unit 202 may initiate the playback of the interaction scenario itself.

In response to the notification, query unit 204 may query an animation database for a valid transitional animation. In one embodiment, a transitional animation is valid when it conforms to defined scoring metrics (e.g., above a defined scoring threshold). Scoring metrics may include, for example, a type of animation (e.g., running, walking, jumping ducking, etc.). Types of transitional animations that are most similar to the target animation may score higher than others whose types are less similar.

In one embodiment, the animation database may be an animation database that is specific to a certain interaction scenario and/or target animation to be performed in the interaction scenario. The database may contain valid transitional animations that are trimmed for a specific target animation. In another embodiment, the database may contain valid untrimmed transitional animations, along with associated metadata indicating that the transitional animations should be trimmed during runtime. In one embodiment, the local database may be created from a larger, global database that contains untrimmed transitional animation blueprints. A database specific to a specific target animation may be created by trimming the transitional animation blueprints in the global database according to parameters associated with the target animation. For example, if the target animation is one in which a basketball player is jumping to perform a slam dunk, the untrimmed transitional animations contained in the global transitional animation blueprint database may be filtered and trimmed according to which animations end with a player poised to jump under the basketball hoop. Only the valid animations (e.g., the ones that end with a player in a proper jumping position) may then be stored (e.g., referenced) in the local database unique to the dunking player animation. In response to the query, query unit 204 may receive one or more valid transitional animations that are specific to the target animation to be performed.

Selection unit 206 may select, from the one or more valid transitional animations, a single transitional animation to replace at least a portion of the target animation. Using a variety of factors, selection unit 206 may determine which of the valid transitional animations is preferred. Selection unit 206 may determine the preferred transitional animation during game runtime, based on which transitional animation would make the interaction scenario look most natural. In one embodiment, selection unit 206 may select a transitional animation by comparing facing angles and scene positions of the transitional scenario to those of the target animation. Transitional animations whose facing angles and scene positions are closest to those of the target animation may score the highest. For example, a transitional animation may be selected because it's starting facing angle most closely matches the game character's current facing angle. In another embodiment, a transitional animation may be selected because it's starting scene position most closely matches the game character's current scene position Details describing the selection and scoring process are further described with respect to FIG. 5.

When a transitional animation is selected, output unit 208 may provide the selected transitional animation for displaying in the game. In one embodiment, output unit 208 replaces a first portion of the target animation with all or a portion of the transitional animation. The transitional animation may have been trimmed based on the current scene position of the game character and the specific target animation to be performed. In one embodiment, output unit 208 utilizes blending metrics that control how a transitional animation is blended into a corresponding target animation. Blending metrics may be defined prior to runtime. For example, a developer may enable more or less rotational blending as compared to translational blending to make a blend look more natural. A developer may specify that a game character's hips should move in a particular way during a blend animation. Blending metrics may define how much rotational, translational and hip movements should be utilized in relation to each other. For example, a blending metric may specify that rotational and hip movements should be in a 1:0 relationship, meaning that all of the blending should occur by moving rotationally, and not moving the hips at all.

Figure 3:
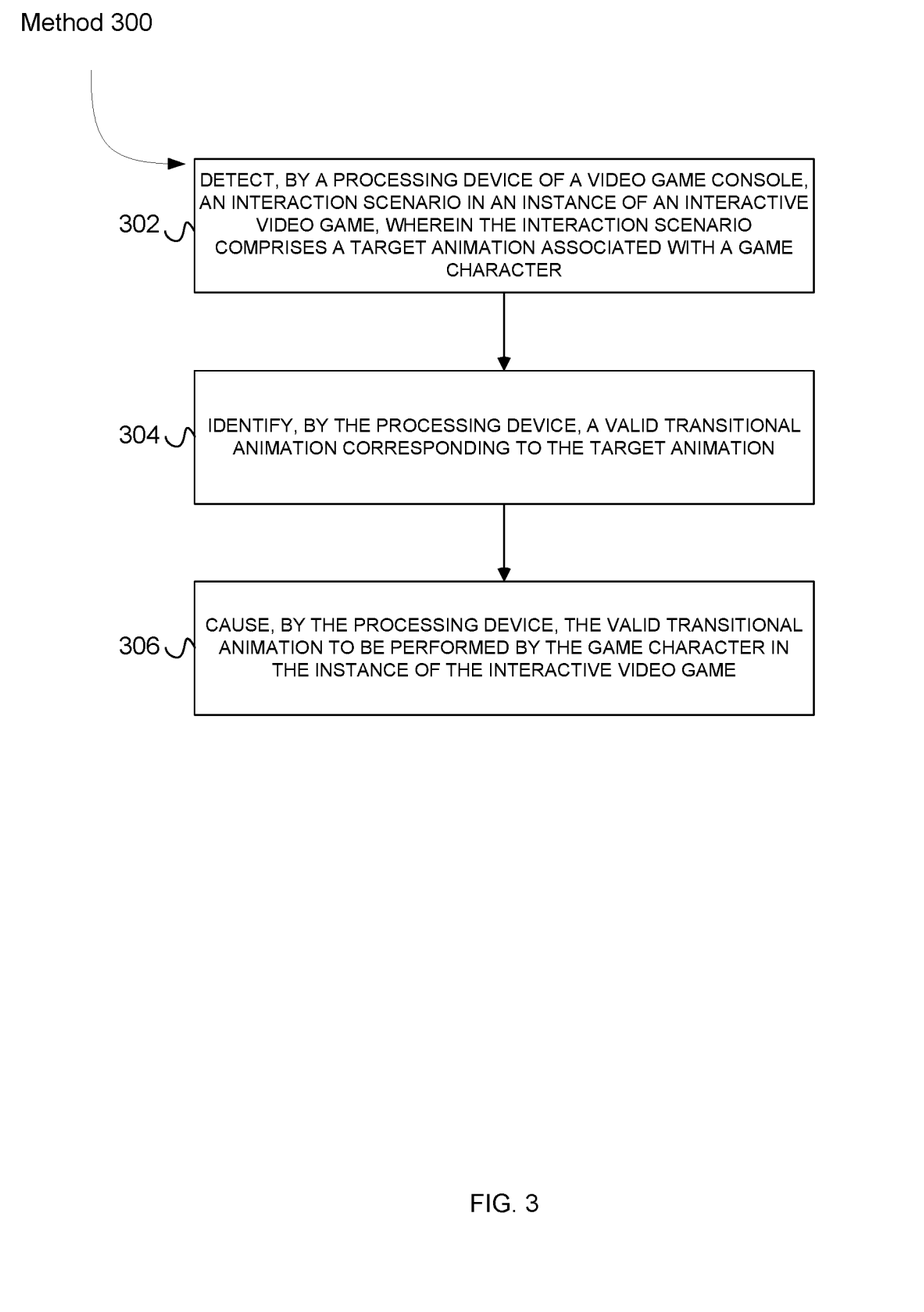
FIG. 3 is a flow diagram illustrating a runtime animation substitution method, according to an implementation.

FIG. 3 is a flow diagram illustrating a runtime animation substitution method, according to an implementation. The method 300 may be performed by processing logic that comprises hardware (e.g., circuitry, dedicated logic, programmable logic, microcode, etc.), software (e.g., instructions run on a processing device to perform hardware simulation), or a combination thereof. Method 300 can provide operations for a runtime animation substitution. In one embodiment, runtime animation substitution unit 104 may perform method 300. Operations of method 300 may be performed in any order so as to fit the needs of the functionality to be provided.

Referring to FIG. 3, at block 302, processing logic detects an interaction scenario in an instance of an interactive video game. The processing logic may be associated with a processing device of a video game console. The interaction scenario may include a target animation associated with a game character, where the target animation is to be performed in the game. In one embodiment, interaction scenario target animations may be individual animations for each game character that together make up an interaction scenario.

When an interaction scenario is detected, processing logic queries an animation database for a valid transitional animation. As described above, the animation database queried may be specific (e.g., unique) to the specific target animation to be replaced. Furthermore, different animation databases may be specific to a target animation depending on what portion of the target animation is to be replaced. For example, if only the first quarter of a target animation is to be replaced, processing logic may query a different database than if the first half of the target animation is to be replaced. Valid transitional animations that are specific to the target animation may be created by filtering transition animation blueprints to identify which transitional animations are valid for the particular target animation (a "jumping" type transitional animation may not be valid to replace a "diving" type target animation). Transitional animation blueprints may further be trimmed to better align with the target animation to be replaced. In one embodiment, animations are aligned when the ending facing angle of the transitional animation is equal to (or approximately equal to) the starting facing angle of the target animation. In another embodiment, animations are aligned when the ending scene position of the transitional animation is equal to (or approximately equal to) the ending scene position of the target animation. Processing logic may receive, from an animation database, a plurality of valid transitional animations corresponding to the target animation. In one embodiment, more than one animation may be valid for a given target animation.

At block 304, processing logic identifies a valid transitional animation corresponding to the target animation. In one embodiment, a valid transitional animation is identified when from a plurality of valid transition animations received from a database. The identified transitional animation may be selected based on a variety of factors, which are discussed in detail with respect to FIG. 4. In one embodiment, processing logic may select a single transitional animation that satisfies a particular objective. For example, processing logic may select a transitional animation, based on the variety of factors, which best satisfies the objective of making the transition from the current physical state of a game character into the target animation look as natural as possible. In one embodiment, selecting the transitional animation that scores the highest is the one that best accomplishes the objective of making the transition from the current physical state of a game character into the target animation look as natural as possible.

At block 306, processing logic causes the valid transitional animation to be performed by the game character in the instance of the interactive video game. In one embodiment, the transitional animation is performed instead of the target animation for a certain period of time. For example, processing logic may determine, based on the variety of factors and the target animation, that the transition into the target animation may look best when the first 40 video frames of the target animation are replaced by the transitional animation. In one embodiment, the period of time of a transitional animation may be longer than the period of time designated to be performed in place of the target animation. In such a case, the transitional animation may be trimmed from the longer duration to the specific duration to be performed. Processing logic may blend the transition operation into the target animation after the time duration expires to create a natural transition.

Figure 4:
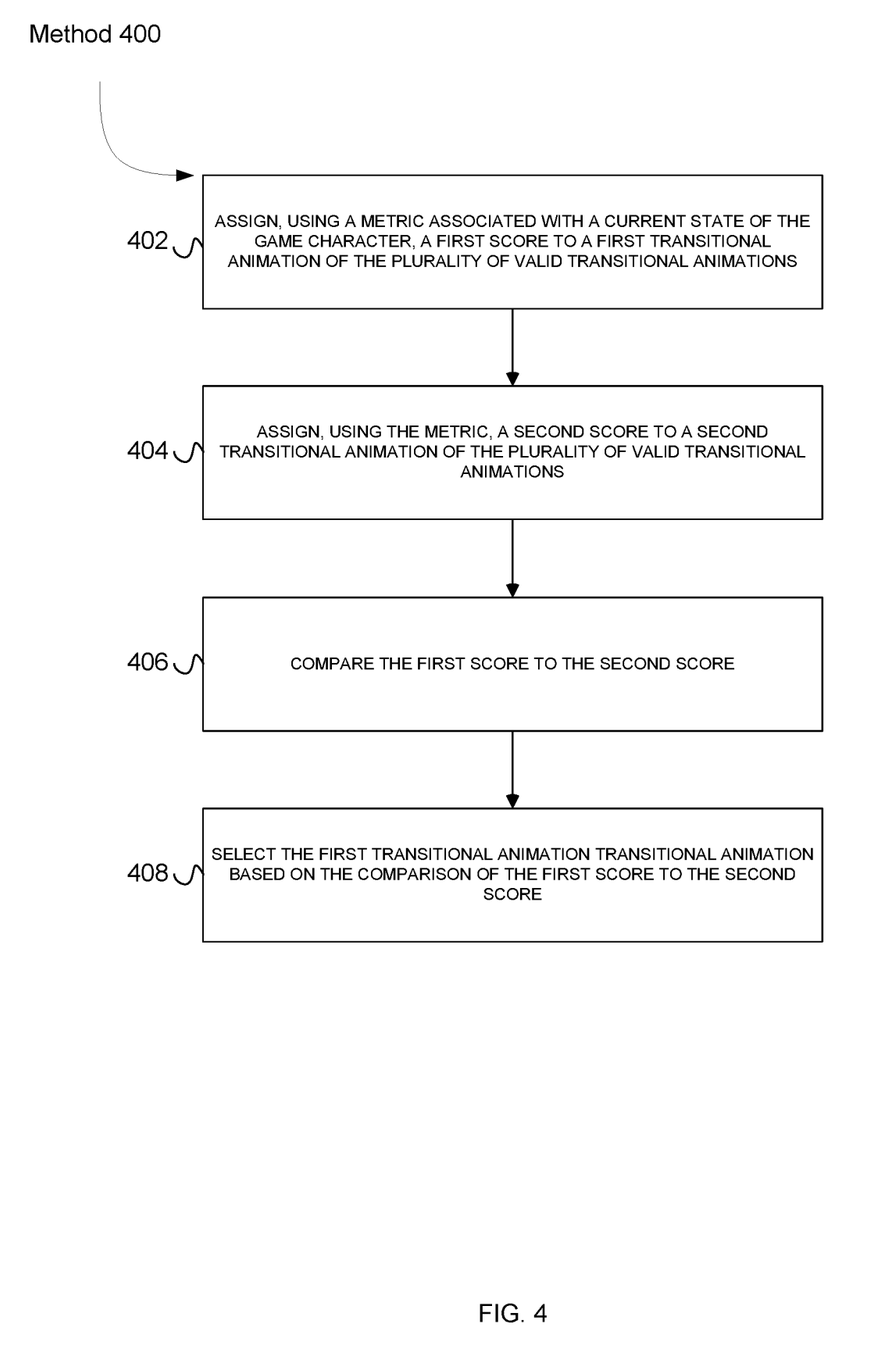
FIG. 4 is a flow diagram illustrating a runtime animation substitution scoring method, according to an implementation.

FIG. 4 is a flow diagram illustrating a runtime animation substitution scoring processing flow, according to an implementation. The processing flow method 400 may be performed by processing logic that comprises hardware (e.g., circuitry, dedicated logic, programmable logic, microcode, etc.), software (e.g., instructions run on a processing device to perform hardware simulation), or a combination thereof. Method 400 can provide operations for a runtime animation substitution. In one embodiment, runtime animation substitution unit 104 may perform method 400. Operations of method 400 may be performed in any order so as to fit the needs of the functionality to be provided.

At block 402 of method 400, processing logic assigns, using a metric associated with a current state of the game character, a first score to a first transitional animation of the plurality of valid transitional animations. In one embodiment, the current state of the game player may include characteristics of the game player such as scene position and postural position. The plurality of transitional animations may, for example, be the transitional animations received in response the query described by FIG. 3. At block 404, processing logic may assign, using the metric, a second score to a second transitional animation of the plurality of valid transitional animations. In one embodiment, the first and the second scores are assigned based on a metric associated with a current physical state of the game character and/or a desired physical state of the game player. For example, the metric may reflect a current facing angle of the game character and/or a current scene position of the game player. The metric may reflect a desired facing angle and/or a desired physical location of the game player. The desired facing angle and scene position may be based on the particular target animation to be played. For example, if the target animation to be played begins with a game character in a particular scene position and facing angle, the desired facing angle and scene position may match those of the target animation.

In one embodiment, the best scoring animations may have a starting facing angle and position that most closely match the current facing angle and position of the basketball game character, and an ending facing angle and position that most closely match the desired facing angle and position. Transitional animations may be trimmed to modify their starting and ending metrics to yield a better score. In one example, a current facing angle of a basketball game character is ninety degrees from the basketball hoop, with a current physical location of the middle of the free-throw line. The target animation for the basketball game character is a dunk animation, in which the game character should be facing the basketball hoop (e.g., a zero degree facing angle), centered, and standing six feet away from the basketball hoop at the start of the animation.

Returning to block 406, processing logic may compare the scores of the first transitional animation and the second transitional animation to select (block 408) the first transitional animation transitional animation based on the comparison of the first score to the second score. In one embodiment, the first transitional animation is selected because it best achieves the desired result (e.g., a natural-looking animation). In one embodiment, the highest scoring transitional animation may be the original target animation (which may be one of the two animations scored by processing logic at blocks 402 and 404). In such a case, the target animation may be allowed to be performed without being replaced by a transitional animation.

Figure 5:
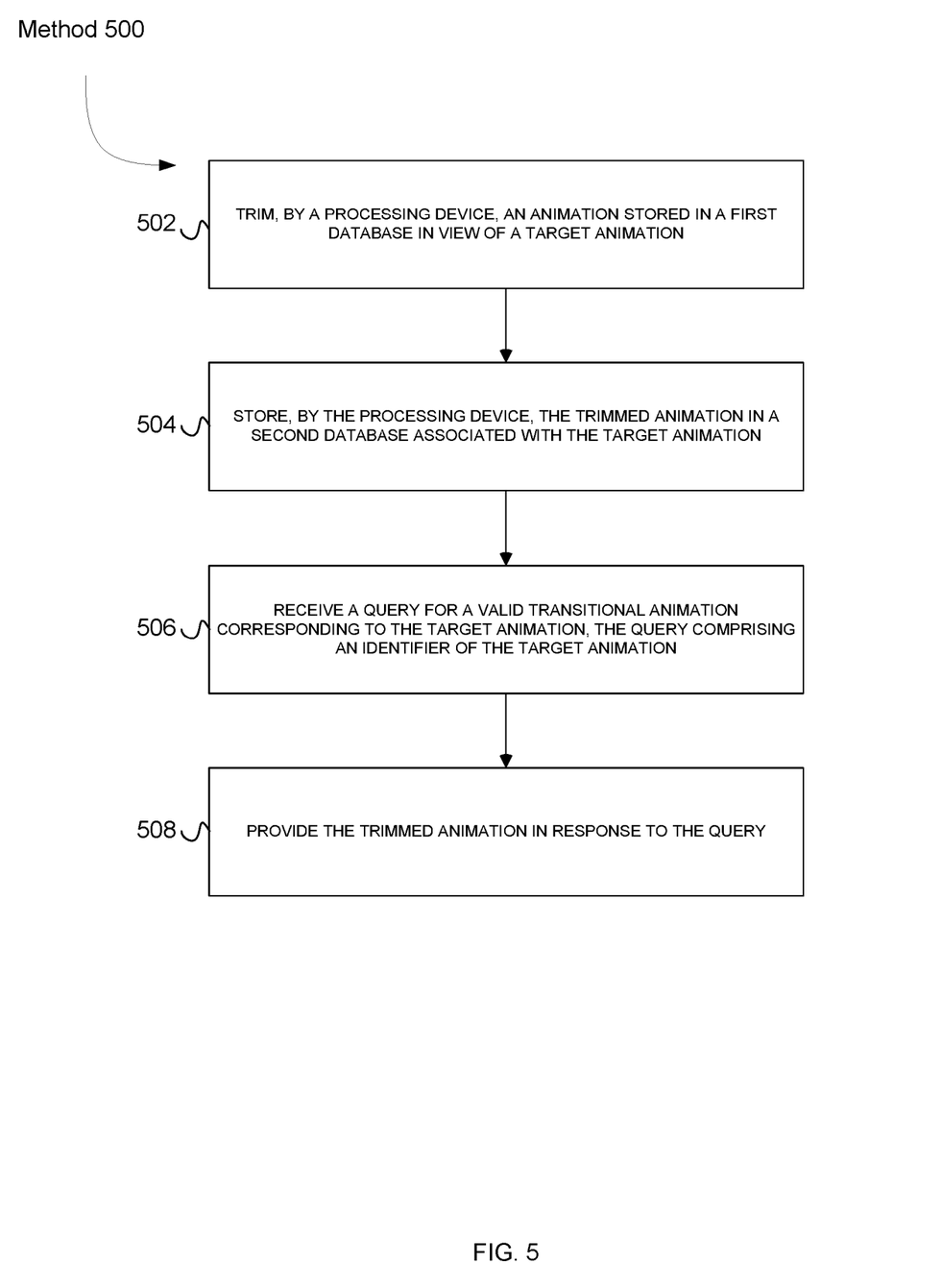
FIG. 5 is a flow diagram illustrating a runtime animation substitution database method, according to an implementation.

FIG. 5 is a flow diagram illustrating a runtime animation substitution database processing flow, according to an implementation. The processing flow method 500 may be performed by processing logic that comprises hardware (e.g., circuitry, dedicated logic, programmable logic, microcode, etc.), software (e.g., instructions run on a processing device to perform hardware simulation), or a combination thereof. Method 500 can provide operations for a runtime animation substitution. In one embodiment, runtime animation substitution unit 104 may perform method 500. Operations of method 500 may be performed in any order so as to fit the needs of the functionality to be provided.

Referring to FIG. 5, at block 502, processing logic trims an animation stored in a first database in view of a target animation. The first database may be the animation blueprint database described herein. In one embodiment, the animation stored it the first global database is untrimmed. The global database may contain a master set of all untrimmed transitional animations. In one embodiment, the animations contained in the global database may be used as blueprints to create trimmed animations stored in databases unique to specific target animations.

In one embodiment, a batch process may be employed to identify valid transitional animations and perform trimming operations to create transitional animations that are specific to certain target animations. Processing logic may identify transitional animations that are valid for a particular target animation based on the metrics described above. Processing logic may ensure that the identified transitional animations have the respective durations meeting or exceeding a certain threshold duration. If a transitional animation is shorter than the defined threshold, processing logic may combine two or more transitional animations using the scoring metrics described herein to ensure that the resulting transitional animation is longer than the defined threshold. In one embodiment, two transitional animations are combined using the same operations to combine a transitional animation and a target animation, as described herein. Processing logic may trim the transitional animations according to those metrics, which may be specific to a particular target animation. For example, if the metrics define a desired facing angle of 90 degrees from a fixed point in the scene, and a transitional animation has a facing angle of 90 degrees 40 frames into the animation and 120 degrees 60 frames into the animation, the last 20 frames may be trimmed from the transitional animation to better suit the target animation. In another embodiment, processing logic does not actually trim the transitional animations, but flags them as eligible to be trimmed according to defined parameters. Furthermore, processing logic may provide a developer with a list of the trimmed transitional animations, their corresponding target animation, and metrics.

At block 504, processing logic stores, by the processing device, the trimmed animation (e.g., derived from a blueprint animation stored in the global database) in a second database corresponding to the target animation. In one embodiment, the database corresponding to the target animation is specific to the target animation only. In another embodiment, a database corresponding to a target animation may be associated with more than one target animation.

At block 506, processing logic receives a query for a valid transitional animation corresponding to the target animation, the query including an identifier of the target animation. In one embodiment, the identified of the target information is received and a database corresponding to the identifier is queried. In this way, only databases that are specific to the target animation may be queried during runtime. In one embodiment, the query includes values of one or more above-described metrics (e.g., facing angles, scene position, etc.). In response to receiving the query, processing logic at block 508 provides the trimmed animation in response to the query.

Figure 6:
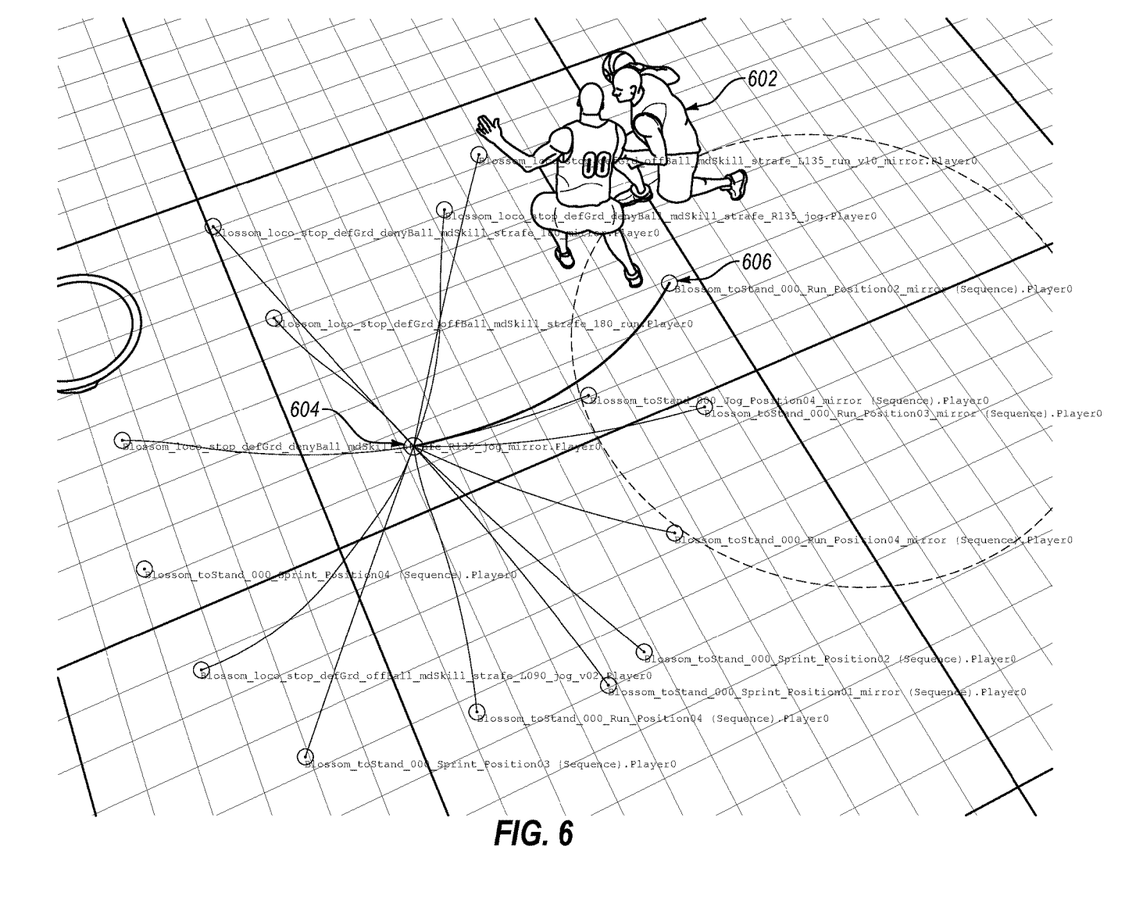
FIG. 6 is a block diagram illustrating runtime animation substitution debug paths, according to an implementation.

FIG. 6 is a block diagram illustrating runtime animation substitution debug paths, according to an implementation. In one embodiment, the details of FIG. 6 are displayed in a graphical user interface (GUI) to a developer debugging a runtime animation substitution. As shown, during a debugging operation, game character 602 is displayed in an interaction scenario, in which game character 602 is to get into position for a "score" target animation. In one embodiment, the dunk target animation is to begin from point 604. A variety of valid transitional animations (e.g., debug paths displayed in the GUI) may be selected to get a game character 602 from his current position to point 604 (FIG. 6, see all debug paths arriving at point 604). In one embodiment, the start of the target animation may originate some distance away from point 604, and thus the first part of the target animation may be included in the display of the valid transitional animations in FIG. 6.

Using the scoring and selection operations described herein, transitional animation 606 "BlossomtoStand_000_Run_Position02_mirror (Sequence). Player0" may be selected as the best transitional animation from the available transitional animations. In this case, transitional animation 606 may be performed instead of the target animation to get game character 602 into position. In a different embodiment, the target animation may be selected as the best animation and thus a separate transitional animation would not replace any portion of the target animation. In one embodiment, the "best" transitional animation may be the transitional animation that yields the most natural looking animation. In one embodiment, a developer may preview any of the valid transitional animations by interacting with the GUI. During preview, game characters may perform their animations in the chosen interaction scenario, including any selected transitional animations.

FIG. 7 is a block diagram illustrating animation scoring, according to an implementation. The details shown in FIG. 7 may be displayed in a GUI to a developer debugging a runtime animation substitution. As shown, the first animation 702 ("BlossomtoStand_000_Run_Position02_mirror (Sequence). Player0" of FIG. 6) in the list of valid animations for a given target animation scored a nine for distance (e.g., scene position) and a nine for angle (e.g., facing angle) 704. The total score for the transitional animation 702 is 245 (see 706), thus beating out the second place transitional animation, which has a score of 239. In one embodiment, transitional animation 702 may be selected to replace a first portion of the corresponding target animation since it received the highest score of all the valid transitional animations.

FIG. 8 illustrates a diagrammatic representation of a computing device 800 which may implement the systems and methods described herein. Computing device 800 may be connected to other computing devices in a LAN, an intranet, an extranet, and/or the Internet. The computing device may operate in the capacity of a server machine in client-server network environment or in the capacity of a client in a peer-to-peer network environment. The computing device may be provided by a personal computer (PC), a set-top box (STB), a server, a network router, switch or bridge, or any machine capable of executing a set of instructions (sequential or otherwise) that specify actions to be taken by that machine. Further, while only a single computing device is illustrated, the term "computing device" shall also be taken to include any collection of computing devices that individually or jointly execute a set (or multiple sets) of instructions to perform the methods discussed herein.

The example computing device 800 may include a processing device (e.g., a general purpose processor) 802, a main memory 804 (e.g., synchronous dynamic random access memory (DRAM), read-only memory (ROM)), a static memory 806 (e.g., flash memory and a data storage device 818), which may communicate with each other via a bus 830.

Processing device 802 may be provided by one or more general-purpose processing devices such as a microprocessor, central processing unit, or the like. In an illustrative example, processing device 802 may comprise a complex instruction set computing (CISC) microprocessor, reduced instruction set computing (RISC) microprocessor, very long instruction word (VLIW) microprocessor, or a processor implementing other instruction sets or processors implementing a combination of instruction sets. Processing device 802 may also comprise one or more special-purpose processing devices such as an application specific integrated circuit (ASIC), a field programmable gate array (FPGA), a digital signal processor (DSP), network processor, or the like. The processing device 802 may be configured to execute runtime animation substitution unit 104 implementing methods 300, 400, and 500 for carrying out runtime animation substitution operations, in accordance with one or more aspects of the present disclosure, for performing the operations and steps discussed herein.

Computing device 800 may further include a network interface device 808 which may communicate with a network 820. The computing device 800 also may include a video display unit 810 (e.g., a liquid crystal display (LCD) or a cathode ray tube (CRT)), an alphanumeric input device 812 (e.g., a keyboard), a cursor control device 814 (e.g., a mouse) and an acoustic signal generation device 816 (e.g., a speaker). In one embodiment, video display unit 810, alphanumeric input device 812, and cursor control device 814 may be combined into a single component or device (e.g., an LCD touch screen).

Data storage device 818 may include a computer-readable storage medium 828 on which may be stored one or more sets of instructions, e.g., instructions of runtime animation substitution unit 104 implementing methods 300, 400, and 500 for carrying out runtime animation substitution operations, in accordance with one or more aspects of the present disclosure. Instructions implementing module 826 may also reside, completely or at least partially, within main memory 804 and/or within processing device 802 during execution thereof by computing device 800, main memory 804 and processing device 802 also constituting computer-readable media. The instructions may further be transmitted or received over a network 820 via network interface device 808.

While computer-readable storage medium 828 is shown in an illustrative example to be a single medium, the term "computer-readable storage medium" should be taken to include a single medium or multiple media (e.g., a centralized or distributed database and/or associated caches and servers) that store the one or more sets of instructions. The term "computer-readable storage medium" shall also be taken to include any medium that is capable of storing, encoding or carrying a set of instructions for execution by the machine and that cause the machine to perform the methods described herein. The term "computer-readable storage medium" shall accordingly be taken to include, but not be limited to, solid-state memories, optical media and magnetic media.

Unless specifically stated otherwise, terms such as "identifying", "assigning", "selecting", "providing", "creating", or the like, refer to actions and processes performed or implemented by computing devices that manipulates and transforms data represented as physical (electronic) quantities within the computing device's registers and memories into other data similarly represented as physical quantities within the computing device memories or registers or other such information storage, transmission or display devices. Also, the terms "first," "second," "third," "fourth," etc. as used herein are meant as labels to distinguish among different elements and may not necessarily have an ordinal meaning according to their numerical designation.

Examples described herein also relate to an apparatus for performing the methods described herein. This apparatus may be specially constructed for the required purposes, or it may comprise a general purpose computing device selectively programmed by a computer program stored in the computing device. Such a computer program may be stored in a computer-readable non-transitory storage medium.

The methods and illustrative examples described herein are not inherently related to any particular computer or other apparatus. Various general purpose systems may be used in accordance with the teachings described herein, or it may prove convenient to construct more specialized apparatus to perform the required method steps. The required structure for a variety of these systems will appear as set forth in the description above.

The above description is intended to be illustrative, and not restrictive. Although the present disclosure has been described with references to specific illustrative examples, it will be recognized that the present disclosure is not limited to the examples described. The scope of the disclosure should be determined with reference to the following claims, along with the full scope of equivalents to which the claims are entitled.

What is claimed is:

1. A method, comprising:
   detecting, by a processing device of a video game console, an interaction scenario in an instance of an interactive video game, wherein the interaction scenario comprises a target animation associated with a game character;
   identifying, by the processing device, a transitional animation corresponding to the target animation;
   responsive to determining that a value of an alignment metric computed at a certain point within the transitional animation is less than a second value of the alignment metric computed at an end of the transitional animation, trimming the transitional animation to delete a set of frames from the certain point of the transitional animation to the end of the transitional animation, wherein the alignment metric reflects at least one of: a first difference between a first facing angle of the game character at the end of the transitional animation and a second facing angle of the game character at a start of the target animation or a second difference between a first scene position of the game character at the end of the transitional animation and a second scene position of the game character at the start of the target animation;
   blending the transitional animation into the target animation; and
   causing, by the processing device, the transitional animation blended into the target animation to be performed by the game character in the instance of the interactive video game.

2. The method of claim 1, wherein identifying the transitional animation comprises:
   receiving, from an animation database corresponding to the target animation, a plurality of transitional animations corresponding to the target animation and a desired destination location.

3. The method of claim 2, further comprising:
   assigning, using a transitional animation metric associated with a current state of the game character, a first score to a first transitional animation of the plurality of transitional animations;
   assigning, using the transitional animation metric, a second score to a second transitional animation of the plurality of transitional animations;
   comparing the first score to the second score; and
   selecting the first transitional animation based on the comparison of the first score to the second score.

4. The method of claim 3, wherein the transitional animation metric reflects at least one of a facing angle or a scene position of the game character.

5. A system comprising:
   a memory; and
   a processing device, operatively coupled to the memory, the processing device to:
      detect an interaction scenario in an instance of an interactive video game, wherein the interaction scenario comprises a target animation associated with a game character;
      identify a transitional animation corresponding to the target animation;
      responsive to determining that a value of an alignment metric computed at a certain point within the transitional animation is less than a second value of the alignment metric computed at an end of the transitional animation, trim the transitional animation to delete a set of frames from the certain point of the transitional animation to the end of the transitional animation, wherein the alignment metric reflects at least one of: a first difference between a first facing angle of the game character at the end of the transitional animation and a second facing angle of the game character at a start of the target animation or a second difference between a first scene position of the game character at the end of the transitional animation and a second scene position of the game character at the start of the target animation;

blend the transitional animation into the target animation; and cause the transitional animation blended into the target animation to be performed by the game character in the instance of the interactive video game.

6. The system of claim 5, wherein the processing device is further to:

receive, from an animation database corresponding to the target animation, a plurality of transitional animation corresponding to the target animation;

assign, using a transitional animation metric associated with a current state of the game character, a first score to a first transitional animation of the plurality of transitional animations;

assign, using the transitional animation metric, a second score to a second transitional animation of the plurality of transitional animations;

compare the first score to the second score; and select the first transitional animation based on the comparison of the first score to the second score.

7. The system of claim 6, wherein the transitional animation metric reflects at least one of a facing angle or a scene position of the game character.

8. A non-transitory machine readable storage medium storing instructions which when executed cause a processing device to:

detect an interaction scenario in an instance of an interactive video game, wherein the interaction scenario comprises a target animation associated with a game character;

identify a transitional animation corresponding to the target animation;

responsive to determining that a value of an alignment metric computed at a certain point within the transitional animation is less than a second value of the alignment metric computed at an end of the transitional animation, trim the transitional animation to delete a set of frames from the certain point of the transitional animation to the end of the transitional animation, wherein the alignment metric reflects at least one of: a first difference between a first facing angle of the game character at the end of the transitional animation and a second facing angle of the game character at a start of the target animation or a second difference between a first scene position of the game character at the end of the transitional animation and a second scene position of the game character at the start of the target animation;

blend the transitional animation into the target animation; and causing the transitional animation blended into the target animation to be performed by the game character in the instance of the interactive video game.

9. The non-transitory machine readable storage medium of claim 8, further comprising instructions that cause the processing device to:

receive, from an animation database corresponding to the target animation, a plurality of transitional animation corresponding to the target animation;

assign, using a transitional animation metric associated with a current state of the game character, a first score to a first transitional animation of the plurality of transitional animations;

assign, using the transitional animation metric, a second score to a second transitional animation of the plurality of transitional animations;

compare the first score to the second score; and select the first transitional animation based on the comparison of the first score to the second score.

10. The non-transitory machine readable storage medium of claim 9, wherein the transitional animation metric reflects at least one of a facing angle or a scene position of the game character.

11. The non-transitory machine readable storage medium of claim 8, wherein the target animation is the selected transitional animation.

12. The method of claim 1, further comprising:

trimming the transitional animation to delete a second set of frames from a start of the transitional animation to a specified point of the transitional animation.

13. The method of claim 1, wherein identifying, the transitional animation is performed based on a metric reflecting a type of movement by the game character.

14. The method of claim 1, wherein blending the transitional animation into the target animation is performed based on a value of a blending metric reflecting a ratio of rotational movements and translational movements of the game character.

15. The system of claim 5, wherein the processing device is further to trim the transitional animation to delete a second set of frames from a start of the transitional animation to a specified point of the transitional animation.

16. The system of claim 5, wherein identifying, the transitional animation is performed based on a metric reflecting a type of movement by the game character.

17. The system of claim 5, wherein blending the transitional animation into the target animation is performed based on a value of a blending metric reflecting a ratio of rotational movements and translational movements of the game character.

18. The non-transitory machine readable storage medium of claim 8, further comprising instructions that cause the processing device to trim the transitional animation to delete a second set of frames from a start of the transitional animation to a specified point of the transitional animation.

19. The non-transitory machine readable storage medium of claim 8, wherein identifying, the transitional animation is performed based on a metric reflecting a type of movement by the game character.

20. The non-transitory machine readable storage medium of claim 8, wherein blending the transitional animation into the target animation is performed based on a value of a blending metric reflecting a ratio of rotational movements and translational movements of the game character.

* * * * *